United States Patent [19]

Matthews

[11] Patent Number: 5,893,900

[45] Date of Patent: *Apr. 13, 1999

[54] METHOD AND APPARATUS FOR INDEXING AN ANALOG AUDIO RECORDING AND EDITING A DIGITAL VERSION OF THE INDEXED AUDIO RECORDING

[75] Inventor: Walter S. Matthews, Folsom, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/623,674

[22] Filed: Mar. 29, 1996

[51] Int. Cl.[6] .............. G10L 3/00; G10L 3/02; G10L 9/00
[52] U.S. Cl. .............................. 704/200; 704/278
[58] Field of Search ................. 395/2.09, 2.79, 395/2.85, 2.87; 704/200

[56] References Cited

U.S. PATENT DOCUMENTS

| | | | |
|---|---|---|---|
| 4,375,083 | 2/1983 | Maxemchuk | 395/2.87 |
| 5,220,611 | 6/1993 | Nakamura et al. | 395/2.85 |
| 5,249,289 | 9/1993 | Thamm et al. | 395/600 |
| 5,367,609 | 11/1994 | Hopper et al. | 395/2.87 |
| 5,483,619 | 1/1996 | Blanchard | 704/278 |
| 5,499,316 | 3/1996 | Sudoh et al. | 395/2.79 |
| 5,526,407 | 6/1996 | Russell et al. | 395/2.09 |
| 5,586,216 | 12/1996 | Degen et al. | 395/2.85 |
| 5,600,756 | 2/1997 | Ely | 395/2.87 |

OTHER PUBLICATIONS

"Introducing Memo Manager 120", Sharper Image Design™, The Sharper Image ®, p. 171 (1995).

Maxemchuk, N. F., "An Experimental; SpeechStorage and Editing Facility", The Bell System Technical Journal, vol. 59, No. 8, Oct. 1980, pp. 1383–1395.

*Primary Examiner*—David R. Hudspeth
*Assistant Examiner*—Patrick N. Edouard
*Attorney, Agent, or Firm*—Blakely, Sokoloff, Taylor & Zafman LLP

[57] ABSTRACT

An apparatus for processing and editing an analog audio recording. An analog audio recording device comprises a data receiver for receiving analog audio data and a plurality of analog markers, an analog output for outputting the analog audio data with the plurality of analog markers, and a processing unit coupled to the analog output. The processing unit comprises digitizing circuitry for digitizing the analog audio data with the plurality of analog markers to create a digital audio file comprising digital audio data and a plurality of digital markers. The processing unit also comprises integrated circuit memory storing editing software for editing the digital audio file using the plurality of digital markers to create an edited digital audio file.

24 Claims, 5 Drawing Sheets

METHOD AND APPARATUS FOR INDEXING AN ANALOG AUDIO RECORDING AND EDITING A DIGITAL VERSION OF THE INDEXED AUDIO RECORDING

FIELD OF THE INVENTION

The present invention relates to the field of audio recording. More particularly, the present invention relates to editing analog audio recordings which have been converted to a digital form.

BACKGROUND OF THE INVENTION

It is possible to record analog audio information on a magnetic tape medium or, in the form of discrete charges, on a silicon medium. Recent audio signal compression techniques allow analog audio recordings to be processed for storage in digital form on a computer hard disk, a floppy disk, or other, similar media. Recent advances in signal compression technology make it possible to store more than 1000 hours of analog recording on a single hard disk after being converted to purely digital form and compressed. Audio signal processing capability can be resident on a personal computer (PC), or other computer, in the form of signal processing software. Alternatively, audio signal processing capability can be provided to the computer by an auxiliary digital signal processing (DSP) add-on card or an external DSP peripheral. Once stored in memory on the computer as digital information, voice files can be managed by software written for that purpose.

The cost of hard disk memory continues to decrease. In addition, compression techniques continue to improve, allowing more analog audio information to be stored on less storage space. These developments make use of a computer for storing and manipulating tape-based audio information more attractive. Some disadvantages of tape-based or silicon-based storage of analog audio information are also present with current storage of digital audio information. For example, because the analog or digital audio data is present in a continuous stream, identifying and locating a particular segment requires tedious searching. In addition, editing the audio data to leave out some parts and rearrange others requires identifying and locating segments, and manual cutting and pasting.

SUMMARY AND OBJECTS OF THE INVENTION

It is an object of the present invention to provide an improved method and apparatus for indexing audio files.

It is another object of the present invention to provide a faster, easier method for editing audio files.

An apparatus for processing and editing an analog audio recording is described. An analog audio recording device comprises a data receiver for receiving analog audio data and a plurality of analog markers, an analog output for outputting the analog audio data with the plurality of analog markers, and a processing unit coupled to the analog output. The processing unit comprises digitizing circuitry for digitizing the analog audio data with the plurality of analog markers to create a digital audio file comprising digital audio data and a plurality of digital markers. The processing unit also comprises integrated circuit memory storing editing software for editing the digital audio file using the plurality of digital markers to create an edited digital audio file.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

An apparatus for recording and editing audio data is described below that allows indexing, or marking of audio data during recording. In one embodiment, markers are inserted during recording which represent topics and sections within the recording. In various embodiments, markers can be voice markers or tone markers. In one embodiment, date and time markers are automatically inserted into the audio recording when the recording device is switched on. The markers inserted in the audio data can later be used to edit a digital version of the data automatically, using software on a computer. For one embodiment, a tape recorder is used as a recording device. For another embodiment, a tape recorder includes the apparatus for marking the audio recording. Other embodiments are envisioned which use, as a recording device, a device with a silicon medium for recording an analog audio signal in the form of discrete charges.

Figure 1:
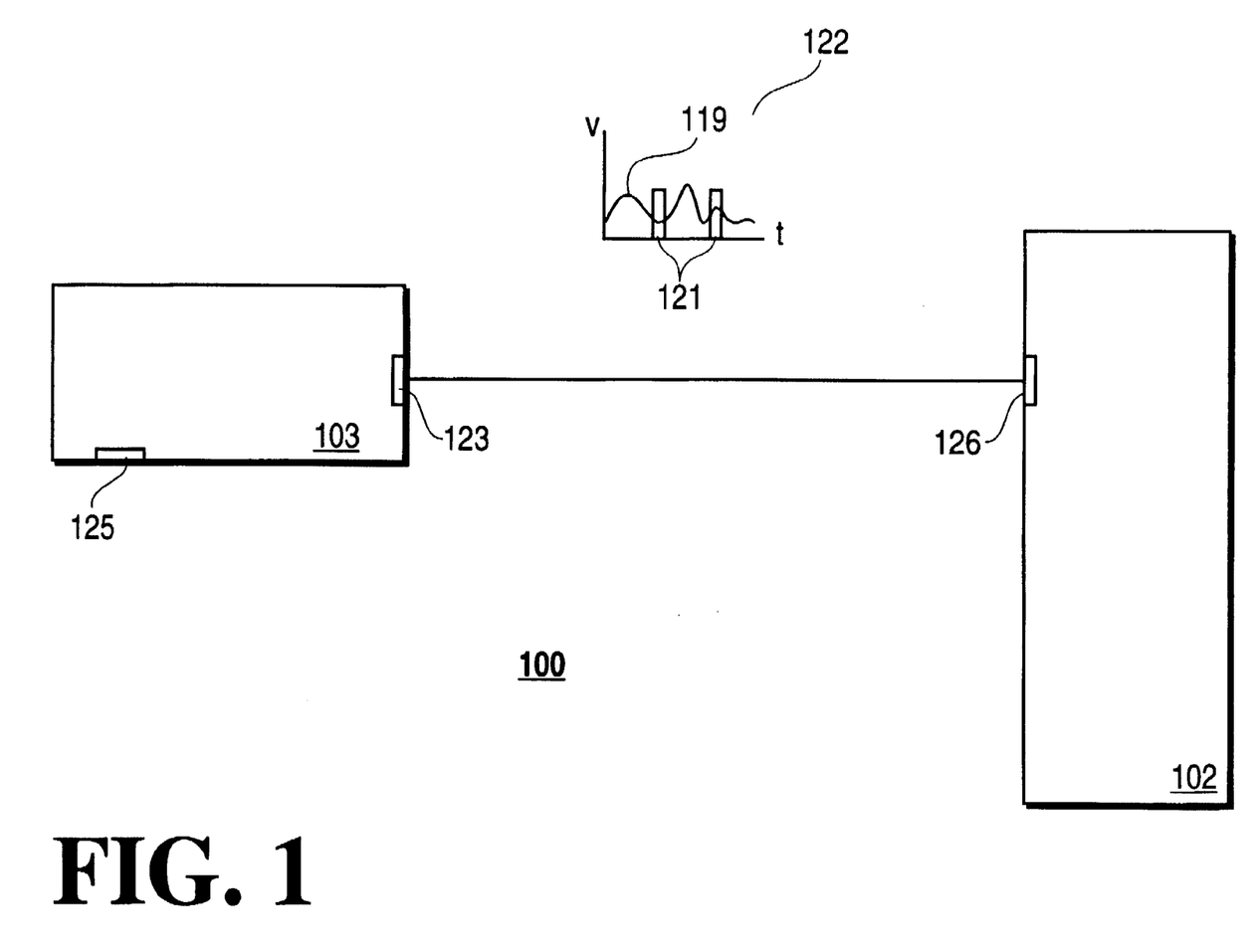
FIG. 1 is a block diagram of an embodiment of an audio recording, converting and editing system.

FIG. 1 is a block diagram of an embodiment 100 of an audio recording, converting and editing system. Analog recording device 103 includes analog input 125 and analog output 123. Analog recording device 103 can be any device capable of storing analog audio information, for example, a magnetic tape recording device or a device storing analog data on silicon in the form of discrete voltages. Converting and editing system 102 includes analog input/output 126, which is shown coupled to analog output 123 of analog recording device 103. Analog waveform 122 is a representation of the analog signal recorded by recording device 103 showing voltage as a function of time. Analog waveform 122 includes analog data waveform 119 and analog markers 121. Analog waveform 122 is transferred from analog recording device 103 to converting and editing system 102. For other embodiments, analog input/output 126 is configured to output an edited analog audio file to analog input 125 of recording device 103.

Figure 2:
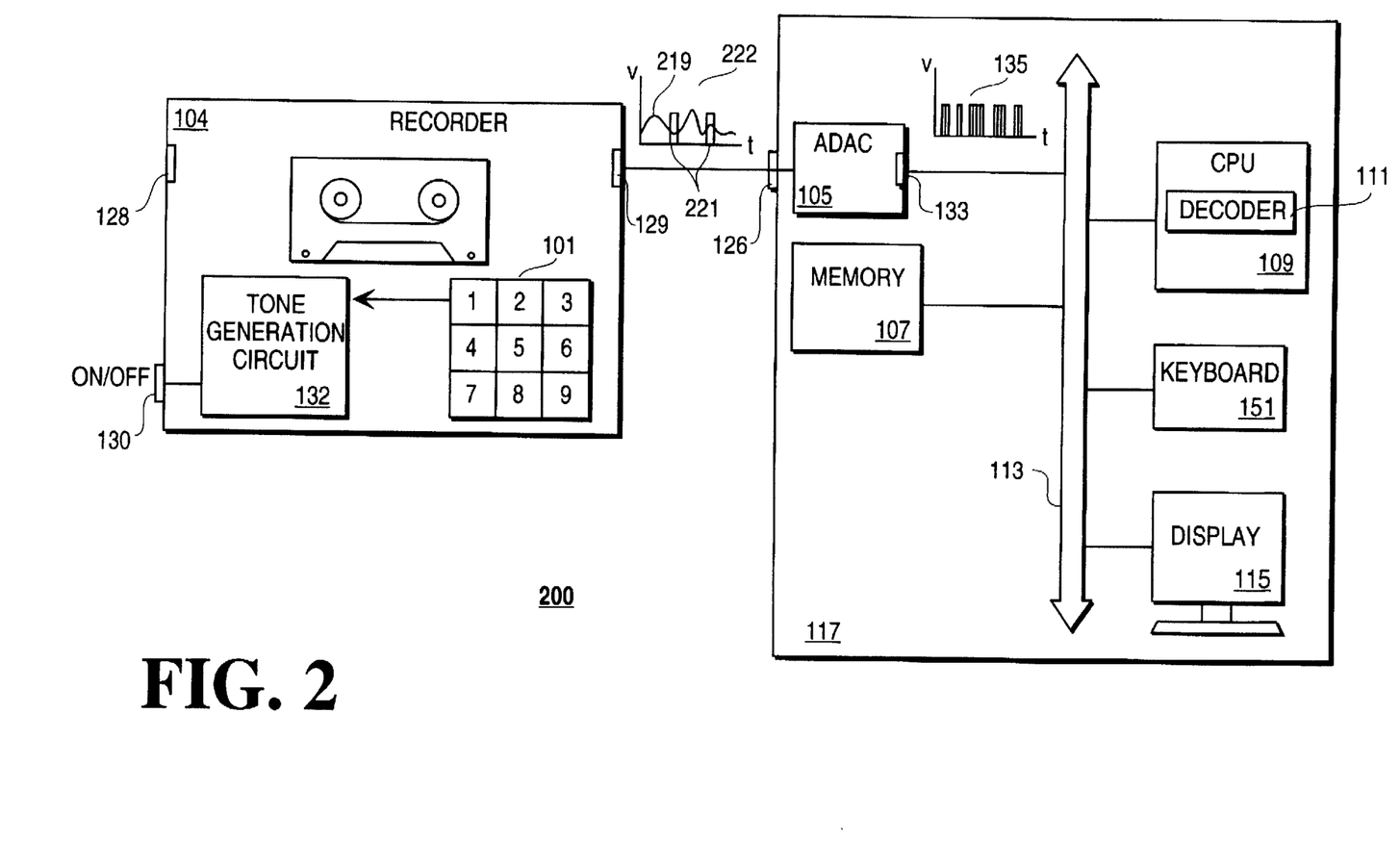
FIG. 2 is a more detailed block diagram of an embodiment of an audio recording, converting, and editing system.

FIG. 2 shows an embodiment 200 of an audio recording, converting, and editing system using magnetic tape recording device (tape recorder) 104 as an analog recording device. Other embodiments could use, for example, a silicon device as an analog recording device. For this embodiment, computer system 117 comprises a converting and editing system. Tape recording device 104 and computer system 117 contain elements known in the art which are not pertinent to the present invention and will not be described in detail.

Tape recorder 104 records analog audio signals on magnetic tape and also comprises apparatus for marking an analog audio recording. Tape recorder 104 comprises tone generation circuit 132, keypad 101, analog output 129, analog input 128, and ON/OFF button 130. ON/OFF button 130 is coupled to tone generation circuit 132. Whenever ON/OFF button 130 is placed in the "ON" position, tone generation circuit 132 is activated. The time and date given by a time keeping IC of tone generation circuit 132 is translated by circuit 132 into a coded tone, such as one of coded tones 221, which becomes part of the analog recording to be transmitted to ADAC 105 of computer system 117 through analog output 129.

During the recording of analog audio data, keys 1 through 9 of keypad 101 can be depressed to generate an identifying tone which will become part of the analog audio recording as an analog marker.

Audio data which has been recorded on magnetic tape is output through analog output 129 to computer system 117. For this embodiment, computer system 117 includes analog to digital to analog converter (ADAC) 105. Other devices converting an analog audio signal to a digital audio signal could be used instead of ADAC 105. The analog audio data from tape recorder 104 enters computer system 117 through analog input/output 126 of computer system 117 as analog waveform 222. Analog waveform 222 includes analog data waveform 219 and analog markers 221. Each time one of the keys of keypad 101 is depressed during recording, an analog marker 221 is created by recording the resultant identifying tone. The analog marker 221 becomes part of the analog recording at the point in time the key was depressed.

Identifying tones can be any distinctive tone which can be distinguished from the surrounding analog data. For example, dual tone multifrequency (DTMF) tones can be used. These tones are used in telephone transmission and are generated by pressing keys on a telephone keypad.

ADAC 105 transforms the analog audio signal into a digital one using any one of the several digitizing techniques known in the art which is recognized by the particular computer system. For example, pulse code modulation (PCM) is analog-to-digital conversion of a type in which the information contained in instantaneous samples of an analog signal is represented by digital words in a serial bit stream. In PCM, the voltage of an analog signal is sampled at regular intervals and quantized into discrete values. Quantized sample voltages can then be represented by a variety of digital codes wherein the analog information can be represented as a serial bit stream. Digital signal 135 is an example of the appearance of a digital signal waveform created from an analog waveform using PCM. Analog markers 221 are digitized along with the analog signal and become part of digital signal 135.

Digital signal 135 exits ADAC 105 through digital input/output 133 and is conveyed on system bus 113 to central processing unit (CPU) 109. Digital signal 135 can be stored in memory 107. CPU 109 includes decoder 111. Decoder 111 is designed to receive digital signals in the encoded form of digital signal 135. Decoder 111 includes software designed to recognize the digital markers in digital signal 135. The software interprets each marker as having a particular function.

Figure 3:
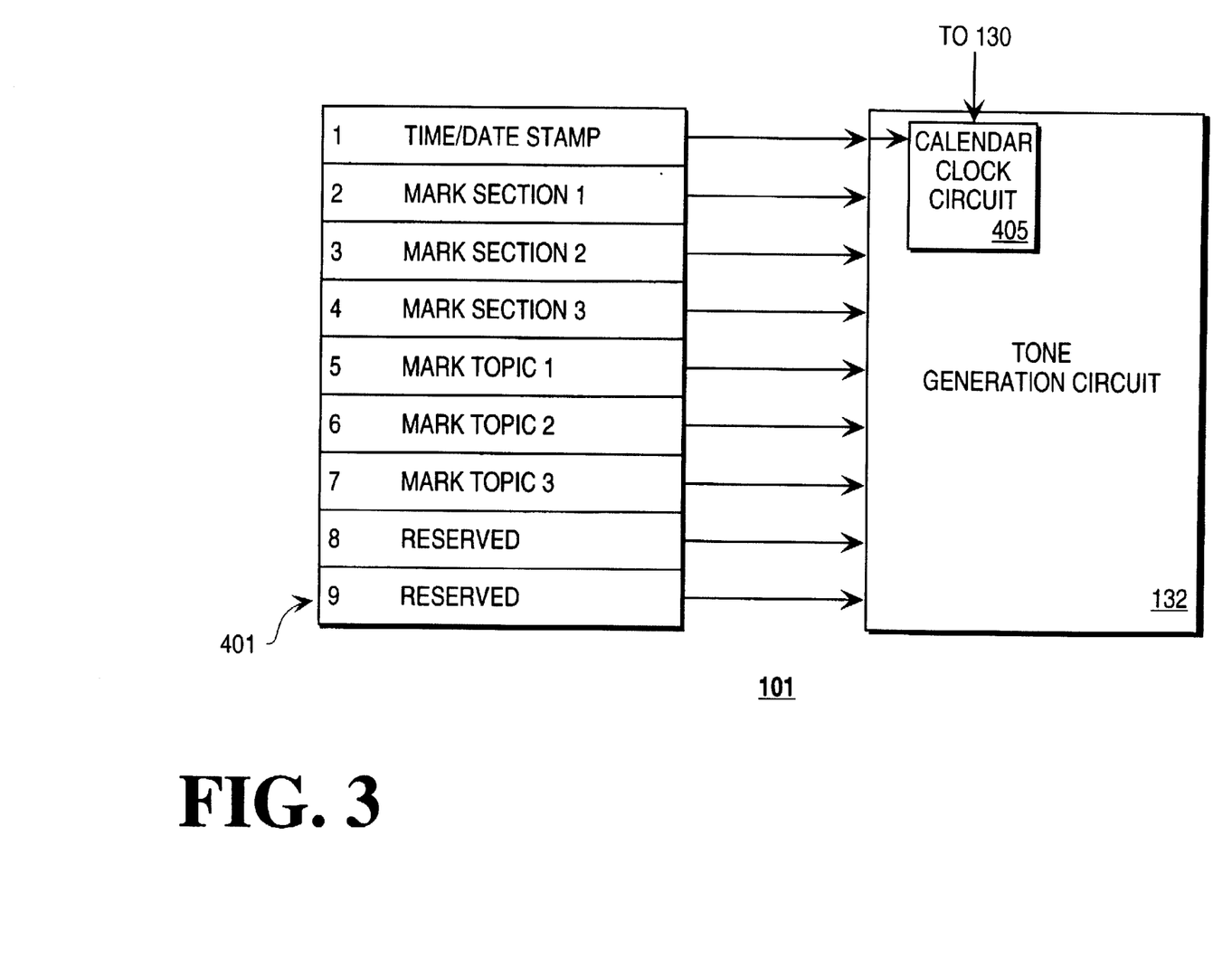
FIG. 3 is a block diagram of a keypad.

FIG. 3 shows keypad 101 including key functions 401 and tone generation circuit 132. Key function 1 is marking the current date and time, or date/time stamping. Key 1 is connected to calendar clock circuit 405 of tone generation circuit 132. Calendar clock circuit 405 includes an integrated circuit (IC) capable of keeping time, such as the DP8570 from National Semiconductor Corp. of Santa Clara, Calif., or the MC146818 from Motorola Semiconductor Products of Phoenix, Ariz. Calendar clock circuit 405 also includes circuitry for transmitting a coded tone in response to the time and date given by the time keeping IC. When the key corresponding to the time/date stamp function is pressed, the time keeping EC is activated. Calendar clock circuit 405 is also coupled to ON/OFF button 130. When ON/OFF button 130 is placed in the ON position, calendar clock circuit 405 is activated for marking the date and time on the analog recording.

Key function 2 is marking a section of audio data as section 1. Key function 3 is marking a section of audio data as section 2. Key function 4 is marking a section of audio data as section 3. Key function 5 is marking a section of audio data as relating to topic 1. Key function 6 is marking a section of audio data as relating to topic 2. Key function 7 is marking a section of audio data as relating to topic 3. Keys 8 and 9 are reserved for functions to be added later. When any one of keys 1 through 7 is pressed, a signal corresponding to the key enters tone generation circuit 403, which identifies the key and generates the proper tone.

For other embodiments, different numbers may relate to different key functions and there may be a greater or lesser number of functions. For other embodiments a single key or button can be used instead of multiple keys. The single key can be pressed single or multiple times to generate a coded series of tones, each series representing a different function.

Figure 4:
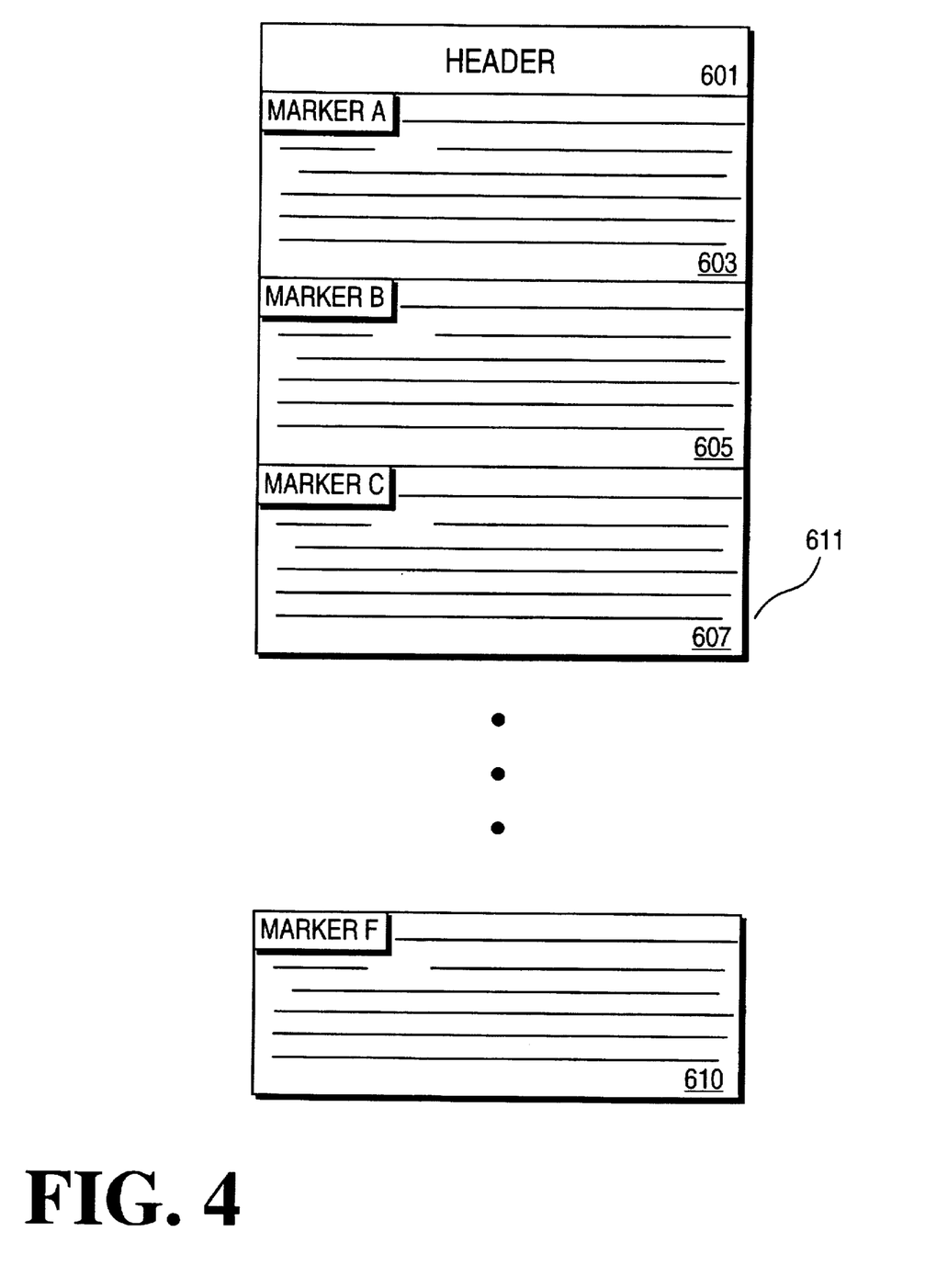
FIG. 4 is an illustration of a digital audio file format.

The software of decoder 111 creates a digital audio file using the digital audio data and the digital markers. FIG. 4 is an illustration of the arrangement of a digital audio file 611 of one embodiment. The format of digital audio file 611 is known as tagged file format, and includes header 601 containing information pertinent to interpretation of the file by a software program reading it. Digital audio file 611 could have various other formats in different embodiments. Section 603 contains a first section of audio data marked by marker A. Decoder 111 inserts marker A (as well as markers B through F). After interpreting the digital markers as indicating one of the key functions of FIG. 3, decoder 111 inserts a marker containing the proper information corresponding to the key function at the appropriate location in the file. For example, assume the first digital marker encountered was a digital version of an analog marker placed by pressing key 5. The software of decoder 111 recognizes a tone generated by key 5 as marking topic 1. Assuming further that topic 1 is geometry, decoder 111 inserts marker A at the top of section 603 indicating that section 603 contains geometry material.

Section 605 is marked by marker B, section 607 is marked by marker C, and so on until the last section in the digital audio file is encountered. In this embodiment, the final section is section 610, marked by marker F. Other embodiments could, however, have more or fewer sections than digital audio file 111.

Referring again to FIG. 2, the digital audio file can be stored in memory 107 after processing in CPU 109. The digital audio file can also be displayed on display 115 for reading by a user. Editing software is stored in memory 107 which manipulates data contained in the digital audio file with a tagged file format. Software recognizing tagged file format is known in the art, and will not be described in detail. A user may specify that the file be edited using the markers by entering commands through computer keyboard 151. For instance, a user can specify that all sections with the same topic be compiled into one file. The editing software recognizes the markers in the digital audio file and creates the resultant edited file as directed by the user commands. The editing software can recognize unrelated, random markers and assemble a file with, for example, only related topics in chronological order. In this way, a user can edit an audio file without having to listen to the analog version, or having to view the digital audio file to determine how to edit it, or having to edit the digital audio file by hand as it is displayed on the display device.

Figure 5:
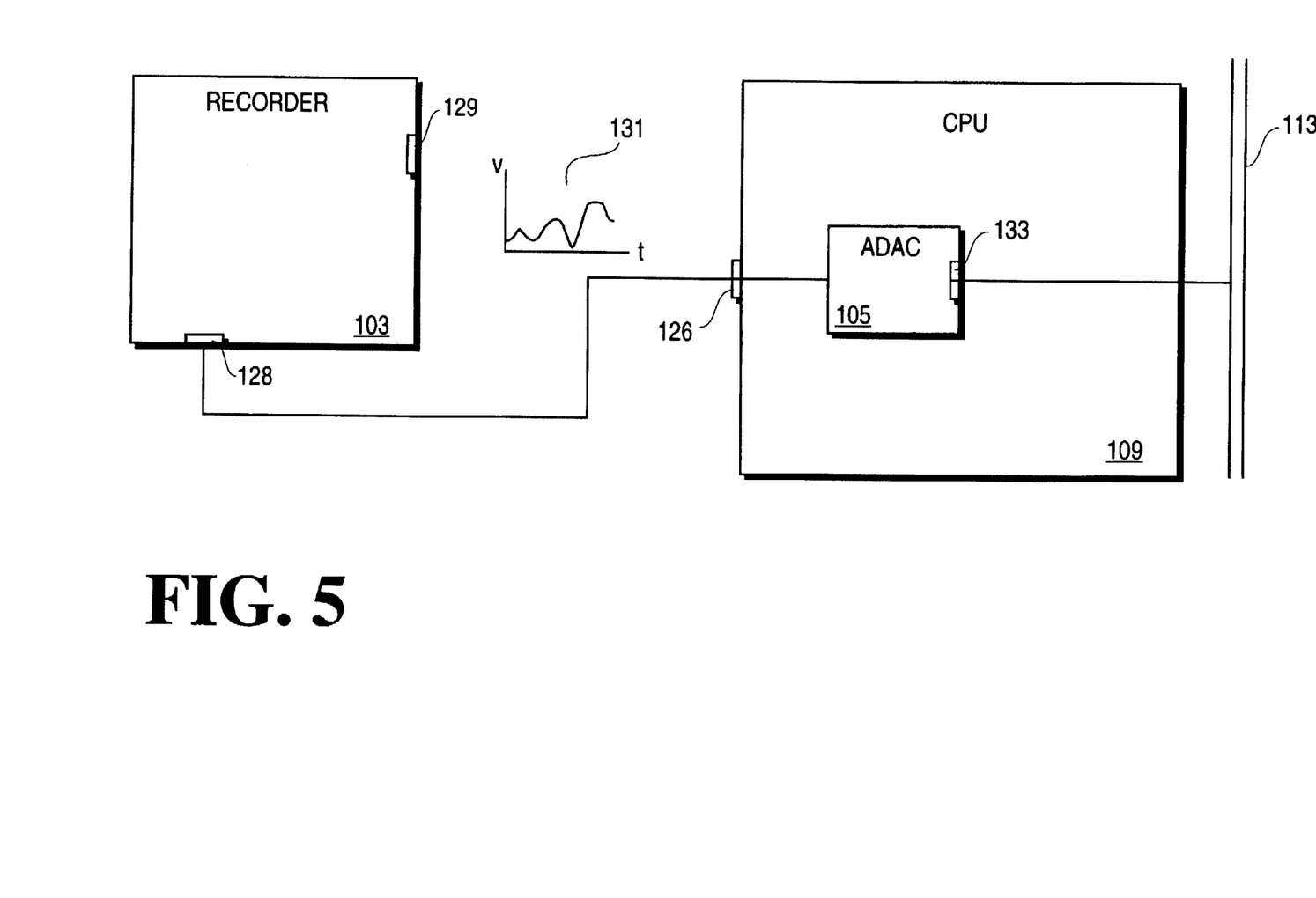
FIG. 5 is a block diagram of an embodiment of an audio recording, converting and editing system configured to provide playback of an edited audio file.

FIG. 5 is an illustration of an embodiment configured for an edited audio file to be uploaded to tape recorder 104 for playback. Analog signal 131 is the result of processing the edited digital audio file in ADAC 105. The edited digital audio file is sent to ADAC 105 digital input/output 133 on system bus 113 from memory 107. ADAC processes the digital audio signal and outputs resultant edited analog audio signal 131. Edited analog signal 131 is fed into analog input 128 of tape recorder 104 for recording on magnetic tape. It is thus possible for a user to listen to the edited tape without having had to go through the tedious process of scanning and editing the original content by hand.

For another embodiment, spoken words serve as identifying markers in an audio recording. Analog input port 128 comprises a microphone capturing sound which makes up the audio data as well as words spoken to indicate identifying markers. For example, a user can say the word "one" when intending the marker to serve the function of marker one. Software in decoder 111, which receives the digital audio signal including markers after processing by ADAC 105, can recognize the voice-generated digitized audio signals and interpret them as representing particular functions. For example, the spoken word "one" can indicate "mark section one" and so on. For this embodiment, the analog audio signal with voice-generated identifying markers is transferred to ADAC 105 and digitized in a way which is recognized by the software of decoder 111. Various methods of analog-to-digital conversion are known in the art and will not be discussed in greater detail.

Decoder 111 uses the voice-generated digital markers to create a digital audio file which may be edited with editing software and viewed on display device 115 or uploaded to tape recorder 104 after processing in ADAC 105. For this embodiment, any tape recorder can be used. For this embodiment, it is not necessary to use a tape recorder with all the features of tape recorder 104.

In the foregoing specification, the invention has been described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus for processing and editing an analog audio recording comprising:

an analog audio recording device comprising a data receiver that receives analog audio data that includes a plurality of analog markers;

an analog output that outputs the analog audio data with the plurality of analog markers;

a processing unit coupled to the analog output comprising:

digitizing circuitry that digitizes the analog audio data with the plurality of analog markers to create a digital audio file comprising digital audio data and a plurality of digital markers;

a computer readable medium that stores editing software that edits the digital audio file to create an edited digital audio file, including file headers created by the editing software using the digital markers, wherein the editing software, in response to a command input by a user, automatically performs an editing operation using digital markers, including spoken words, specified by the user.

2. The apparatus of claim 1, wherein the digitizing circuitry comprises an analog-to-digital-to-analog converter (ADAC).

3. The apparatus of claim 1, wherein the analog audio recording device further comprises a tone generator that generates coded tones, the plurality of analog markers comprising the coded tones.

4. The apparatus of claim 3, wherein the coded tones are dual tone multifrequency (DTMF) tones.

5. The apparatus of claim 2, wherein the data receiver receives an edited analog audio file generated from the edited digital audio file.

6. The apparatus of claim 1, wherein the plurality of analog markers comprise:

a marker indicating a date and a time;

a marker indicating a section of the analog audio data;

a marker indicating a topic of the analog audio data.

7. The apparatus of claim 1, wherein the analog audio recording device comprises a magnetic tape audio recording device.

8. The apparatus of claim 1, wherein the analog audio recording device comprises an integrated circuit audio recording device.

9. A system for processing and editing an analog audio recording comprising:

an analog audio recording device comprising a data receiver that receives analog audio data that includes a plurality of analog markers;

an analog output that outputs the analog audio data with the plurality of analog markers;

a computer system coupled to the analog audio recording device comprising:

an analog input coupled to the analog audio recording device that receives the analog audio data and the analog markers;

a signal processing device coupled to the analog input that converts the analog audio data and the analog markers to a digital signal comprising digital audio data and digital markers;

a system bus coupled to the signal processing device that conveys the digital signal to and from the signal processing device and a central processing unit (CPU) that includes a decoder, wherein the decoder includes;

a decoder coupled to the CPU including a computer readable medium that stores executable instructions that decode the digital signal and create a digital audio file comprising digital audio data and informational headers created using the digital markers;

a memory coupled to the system bus that stores the digital audio file, the memory further storing editing software, wherein the editing software, in response to a command input by a user, automatically performs an editing operation on the digital audio file using digital markers specified by the user.

10. The system of claim 9, wherein the data receiver is a microphone and the plurality of analog markers are spoken words.

11. The system of claim 9, wherein the decoder comprises an analog-to digital-to-analog converter (ADAC).

12. The system of claim 9, further comprising a keypad coupled to the data receiver, the keypad comprising:

a plurality of keys;

a tone generator that generates one of a plurality of coded tones in response to depression of one of the plurality of keys, the analog markers comprising the plurality of coded tones.

13. The system of claim 12, wherein the coded tones are dual tone multifrequency (DTMF) tones.

14. The system of claim 9, wherein the computer system further comprises a display device that displays the digital audio file and the edited digital audio file.

15. A method for recording, processing, editing and rerecording audio information comprising the steps of:

(A) receiving audio input and recording the audio input on a medium as analog audio data;

(B) receiving identifying tones concurrently with the audio input and recording the identifying tones on the medium as analog markers, the identifying tones comprising at least one tone representing date and time, at least one tone representing a section of analog audio data and at least one tone representing a topic of a section of analog audio data;

(C) transmitting the analog audio data with the analog markers to an analog-to digital-to-analog converter (ADAC) that converts the analog audio data with the analog markers to a digital signal comprising digital audio data and digital markers;

(D) using executable instructions to decode and process the digital signal to create a digital audio file, including interpreting the digital markers and inserting them into the digital audio file; and (E) using the executable instructions to edit the digital audio file using the digital markers to create an edited digital audio file including informational headers created from the digital markers, wherein a single executable instruction performs a multi-step editing task.

16. The method of claim 15, further comprising the step of (F) displaying the edited digital audio file on a display device of a computer system.

17. The method of claim 15, wherein a plurality of the identifying tones of step (B) are spoken words.

18. The method of claim 15, wherein a plurality of the identifying tones of step (C) are generated when keys of a keypad are depressed.

19. The method of claim 15, wherein the plurality of identifying tones are dual tone multifrequency (DTMF) tones.

20. The method of claim 15 further comprising the steps of:

(H) using the ADAC to convert the edited audio file into an edited analog audio file; and transmitting the edited analog audio file from the ADAC to the medium.

21. The method of claim 15, wherein step (E) wherein the executable instructions are executed in response to commands from a computer keyboard.

22. The method of claim 15, wherein the multi-step editing task comprises identifying sections of the digital audio file having a same digital marker and placing the sections together in the digital audio file.

23. The method of claim 22, wherein the same digital marker is a date and time marker.

24. The method of claim 22, wherein the same digital marker is a topic marker.

* * * * *

UNITED STATES PATENT AND TRADEMARK OFFICE
CERTIFICATE OF CORRECTION

PATENT NO. : 5,893,900
DATED : April 13, 1999
INVENTOR(S) : Walter S. Matthews It is certified that error appears in the above-identified patent and that said Letters Patent is hereby corrected as shown below:

In column 4 at line 3 delete "EC" and insert -- IC --

In column 6 at line 49 delete ";"

In column 6 at line 50 delete "a decoder coupled to the CPU including"

In column 8 at line 20 insert -- (I) before "transmitting"

Signed and Sealed this

Twenty-fifth Day of January, 2000

Attest:

Attesting Officer

*Acting Commissioner of Patents and Trademarks*